Figure 1:
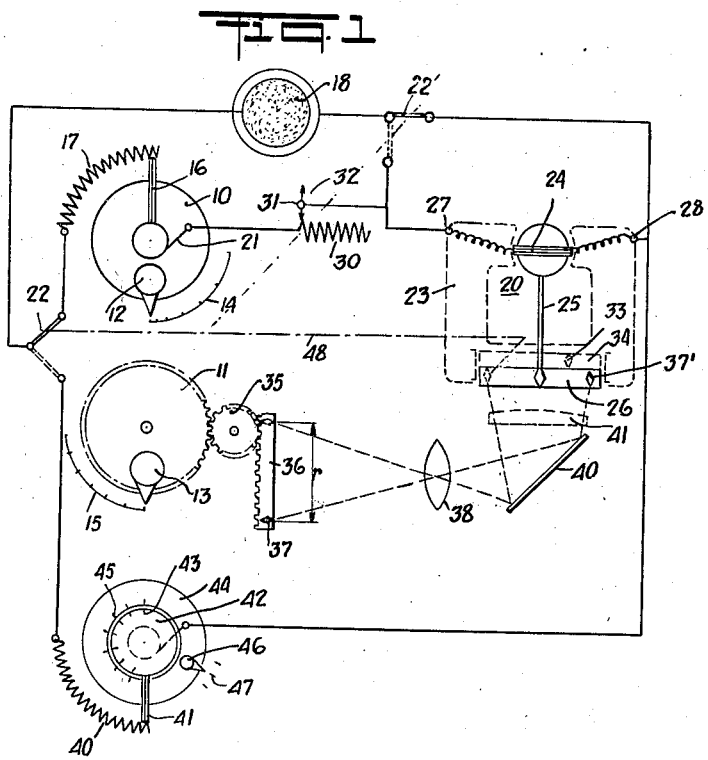

June 26, 1945.　　　　　　K. RATH　　　　　　2,379,102
PHOTOELECTRIC EXPOSURE CONTROL
Filed July 2, 1943　　　　2 Sheets-Sheet 1

INVENTOR.

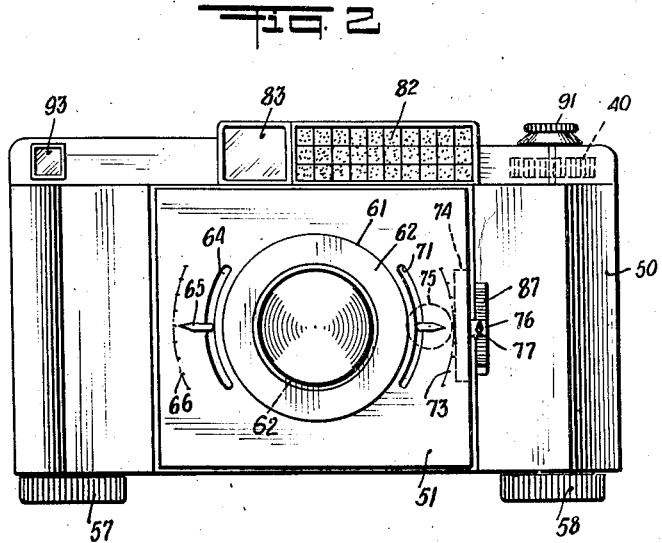
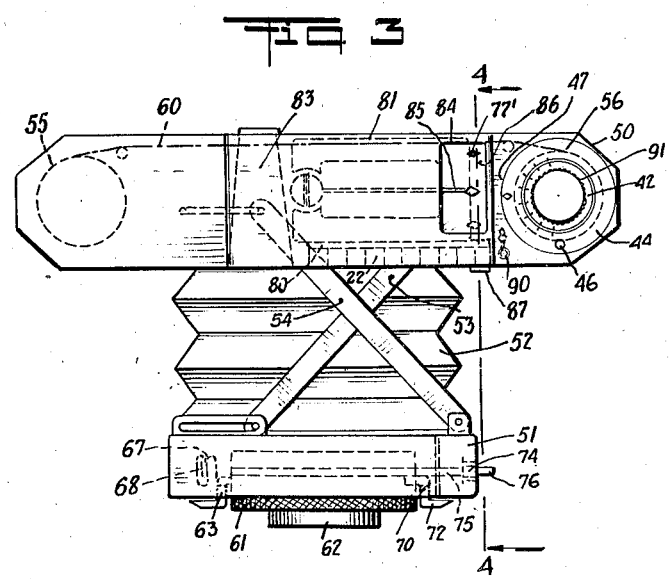

Patented June 26, 1945

2,379,102

UNITED STATES PATENT OFFICE 2,379,102

PHOTOELECTRIC EXPOSURE CONTROL

Karl Rath, New York, N. Y.

Application July 2, 1943, Serial No. 493,212

10 Claims. (Cl. 95—10)

My invention relates to exposure control for photographic cameras of the general type comprising a photo-electric device and means for adjusting the response current of said device varying in proportion to the brightness of a photographic scene or object to a predetermined value defined by an index mark or the like, said current adjusting means being coupled with the exposure adjusting means of the camera, whereby to set said exposure adjusting means to the proper position for obtaining a correctly exposed photograph under varying scene or object brightness conditions.

In the standard photographic camera, exposure is determined substantially by the product of the lens aperture adjustable to varying openings by the aid of an iris diaphragm or the like and exposure time or period of the shutter opening during which the light that emanates from the scene or object to be photographed and passes through the lens of the camera acts on the sensitive emulsion of the plate or film disposed in the focal plane of the camera. Other secondary exposure controlling factors, such as emulsion sensitivity or film speed, filter factors, etc. remain constant over a prolonged period as long as the same film or filter are used by the photographer.

The choice of the lens aperture, also known as stop, and of the exposure time, is in most cases by no means arbitrary, but is governed by pictorial and other considerations which makes it desirable in automatic or semi-automatic exposure control to choose either to suit existing conditions or requirements and to control the adjustment of the other in dependence upon the response of the photo-electric cell. Thus, it may be desired or necessary to insure a certain depth of focus determined in a known manner by the stop or lens aperture. In this case, the control apparatus should enable the adjustment of the coordinated exposure time to the proper value for any given scene or object brightness. Vice versa, there are cases when a certain exposure time or shutter speed is necessary to prevent blurring of the picture due to camera movement or fast moving objects or for any other reason. In this case, the control should enable the adjustment of the aperture to the proper value in accordance with the response of the photoelectric cell.

Accordingly, it is an object of my invention to provide exposure control apparatus of the above character embodied in a camera and capable of mutual operation, that is, allowing either of the lens aperture and exposure time adjustments to be chosen in advance by the photographer and enabling the other adjustment to be controlled or set to the proper value in accordance with the response of a photo-electric cell, i. e. turn an existing scene or object brightness.

Arrangements of the aforementioned type have already become known all of which, however, possess serious disadvantages due to the fact that the different presetting of one exposure control adjustment reacts differently upon the other adjustment so as to make it impossible to insure an accurate control under all circumstances without the use of complicated auxiliary means prohibiting the use of such control devices in portable cameras for amateur and other non-professional uses.

Accordingly, it is a further object of my invention to provide exposure control apparatus of the above character which is both simple in design and easy to operate and which allows the lens aperture and exposure time adjustments to be effected substantially independently and without any mutual electrical interference.

A difficulty experienced with exposure control apparatus of the above and similar type, is due to the fact that for mechanical and other reasons, it is not possible in each case to mount the adjustable element of the exposure meter close to the adjusting organs of the shutter so as to avoid complicated mechanical transmission elements and couplings with their attendant drawbacks of reduced accuracy and likelihood of getting out of adjustment during use and other well known defects.

Accordingly, a further object of my invention is to provide exposure control apparatus of the above character, wherein adjustable mechanical couplings and connections are reduced to a minimum resulting in simplified construction and increased accuracy and reliability of the exposure adjustment.

Figure 4:
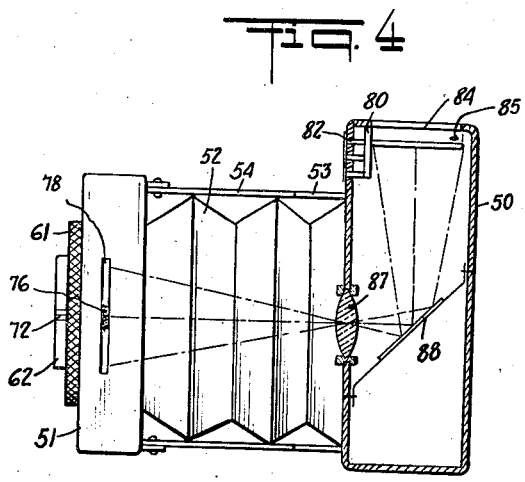

The above and further objects and aspects of my invention will become more apparent from the following detailed description taken in reference to the accompanying drawings forming part of this specification and wherein:

Figure 1 is a schematic diagram illustrating an exposure control system embodying the principles of the invention; Figures 2 and 3 are front and top views, respectively, of a photographic camera construction embodying an exposure control system of the type shown in Figure 1; and Figure 4 is a cross-section taken on line 4—4 of Figure 3.

Like reference characters identify like parts in the different views of the drawings.

Referring more particularly to Figure 1, I have shown at 10 and 11 the lens aperture and exposure time adjustments, respectively, of a camera which may have the form of adjustable discs, rings, etc. and constitute a part of the shutter of any known design. The adjustment of the lens aperture and exposure time may be effected in any suitable manner such as by the aid of adjusting knobs 12 and 13 or the like, each having an index arranged to cooperate with the aperture and exposure time scales 14 and 15, respectively, in a manner well understood by those skilled in the art.

Adjustment 10 carries a sliding contact 16 arranged to cooperate with an electrical resistance element 17 of the wire wound or in any other suitable type, said resistance element being connected in series with a photoelectric cell 18 and a galvanometer or current indicator 20 by way of a slip ring or similar connection 21 and a pair of switches 22 and 22' to be described presently. Indicator 20, in the example shown, comprises a magnet structure 23 having an air gap for receiving a moving coil 24 rotatable therein and carrying a pointer or indicating needle 25 arranged to move over a scale member or dial 26. The ends of coil 24 are connected to terminal posts 27 and 28, respectively, through flexible leads well known and understood from the drawing.

In the example illustrated, the connection from the slip ring 21 to the terminal 27 of the indicator includes a further variable resistance element 30 having an adjustable contact member 31 arranged to move along a fixed scale 32 representing film speed or emulsion sensitivity values. By adjusting member 31 variable amounts of resistance are inserted in the circuit of the photoelectric cell 18 and indicator 20 in addition the resistance 17, whereby to consider varying films in the final exposure adjustment.

The photo-electric cell 18 is preferably of the self-generating or barrier layer type also known as a photo-voltaic cell and adapted to directly generate an electric current in proportion to the illumination or brightness of the scene or object to be photographed towards which the cell is aimed in the operative or measuring position. One well known type of such cells comprises a metal base coated with a layer of crystalline selenium which in turn is covered by a translucent metallic covering layer forming one electrode with said metal base acting as the cooperating electrode of the cell.

Assuming the adjustment 10 to vary the stop or lens aperture for a fixed shutter speed, say 1/25 sec., it will be seen that varying illumination of the photo-electric cell 18 in accordance with a varying scene brightness will result in a proportional deflection of the pointer 25 from its zero or initial position at one end of the scale member 26. By adjusting the control member 10, a definite amount of resistance 17 may be inserted in the circuit, whereby to cause the pointer 25 to assume a predetermined position corresponding to a fixed current defined by an index or fiduciary mark such as shown at 33 and applied to a further scale member 34. By the proper design of the circuit constants and mechanical parts, the control of adjustment 10 in this manner will result in the proper stop or aperture control to obtain a correctly exposed picture under varying scene or object brightness conditions for the assumed shutter speed and a given film speed according to the adjustment of resistance 30 in the manner described.

In order to take into consideration various shutter speeds according to the invention and in fact to enable the pre-selection of either the stop or shutter speed adjustments to suit existing conditions and to subsequently adjust the other adjustment by causing the pointer 25 to coincide with an index or fiduciary mark, I have shown the latter to be variable in its position along the scale member or dial 26 by producing an optical image thereon of a separate index arranged to move with the respective shutter adjustment.

For this purpose, in the example shown, adjustment 11 has the form of a gear meshing with an intermediate gear 35 which in turn serves to move a rack or the like 36 carrying a mark or index 37 of diamond or other shape. In this manner, the adjustment of adjustment 11 within its operating range in accordance with the different shutter speeds or exposure times will result in the index mark 37 to move linearly within the range r and to assume various positions depending on the shutter speed adjustment.

The index 37 is transferred to the dial 26 of the meter 20 by producing an optical image thereof by the aid of a suitable optical system such as a lens 38 and a deflecting element or mirror 40. For this purpose, the dial 26 forms a ground glass and the focal length of the lens 38 is so chosen as to obtain a sharp image 37' of the mark 37 to serve as an adjusting index or fiduciary mark for the pointer 25. If necessary, a further lens 41 of either the positive or negative type may be inserted in the optical path to adapt the system to an existing camera construction.

The system described is so constructed and the constants of the circuit elements so chosen, that all that is required to obtain a correct exposure is to bring pointer 25 and index 27' to coincidence after adjustment of the particular speed of the film used has been made by setting resistance 30 to the proper value in the manner described. If the stop is first selected by the adjustment of control 12 to the corresponding value on scale 14, this will result in a certain deflection of pointer 25 from its zero position, such as shown in the drawing provided the camera or photo cell 18 is properly aimed towards the object or scene to be photographed. All that is further required to set the shutter for the proper exposure time, is to operate the exposure time adjustment 13 so as to cause the index 37 to coincide with the pointer 25. As will be understood, the stop and exposure time adjustments may be interchanged, i. e. adjustment 10 may be coupled with the index member 36 and adjustment 11 may be coupled with resistance 17, without substantially affecting the operation of the system.

The system described will be operative within a given range of scene brightness values depending upon the mechanical facilities and constants of the system. According to one embodiment, the system may be so designed that for a minimum scene brightness defining the lower limit of the range within which the system is to function and adjustment of the exposure time to the largest value by the operation of knob 13, say ¹⁄₁₀ sec., the pointer 25 will coincide with the mark 37 at one end of the dial 26 if the stop is also set to its largest value say F.2 by the aid of operating knob 12, resulting in a correct exposure under the conditions assumed. If the scene brightness falls below the assumed limit, a coincidence of pointer 25 and mark 37 will be no longer possible, since both 12 and 13 have reached their limit positions, thus apprising the photographer that the lower operating limit has been passed.

On the other hand, assuming the maximum scene brightness for which the system is to function, it will be necessary to move both the pointer 25 and index 37' to the opposite end of the dial 26 by reducing both the stop and exposure time to their smallest values say F.22 and ¹⁄₂₅₀ sec., respectively. If under these conditions the scene brightness increases still further, the pointer 25 will assume a greater deflection and, since adjustments 10 and 11 have reached their opposite limits, a coincidence adjustment is no longer possible, whereby to apprise the operator that the upper limit of the operating range has been passed. Within the lower and upper operating limits, the system will function in the manner described by presetting one of the adjustments 10 or 11 and subsequent control of the other adjustment to cause coincidence between the pointer and the index mark 37'.

In order to enable the exposure meter to be used independently of the semi-automatic operation described hereinabove, provision has been made for manual operation and determination of the appropriate stop and exposure time for various scene brightness or object conditions both within and outside the facilities afforded by the automatic control. For this purpose I have shown in Figure 1 a further variable resistance element 40 suitably mounted within the camera and having a sliding contact 41 carried by an adjusting member 42, the latter being provided with a scale 43. Resistance 40 may be substituted for resistance 17 in the photo-electric cell circuit by throwing the switches 22 and 22' from the position shown in full lines to the dotted line position as shown in the drawings. The adjustable scale and operating member 42 of resistance 40 forms a part of a mechanical calculator or computing device comprising a further scale member 44 provided with a scale 45 and adjustable relative to member 42 by the aid of an adjusting knob 46 or the like in accordance with a further fixed scale 47. Scales 43 and 45 may be calibrated in exposure time valuations and scale 47 may represent film speed numbers.

In operation, scale member 44 is set to a position where the index of knob 46 is opposite to the speed number for the film used, whereupon member 42 is operated to control the resistance 40 in the photo-electric cell circuit until the pointer 25 of the indicator 20 coincides with the fixed index mark 33 on dial 34, which latter may be normally concealed and moved into position to overlie dial 26 simultaneously with the operation of switch 22 by the provision of a suitable coupling arrangement connected with the common operating control of switches 22 and 22' indicated at 48 in the drawings. In this manner, scales 43 and 45 will be properly aligned so that any of the coordinated stop and exposure times may be selected for manually adjusting the shutter under varying scene or object brightness conditions.

Referring to Figures 2 to 4 I have shown a practical embodiment of an exposure control apparatus according to Figure 1 in structural combination with a camera of the collapsible bellows type. The camera shown is of standard construction and comprises a body 50, a front panel or shutter casing 51 connected with said body through a collapsible bellows 52 by means of a pair of lazy tongs 53 and 54 or in any other suitable manner known in the art. Items 55 and 56 indicate the supply and take-up film spools and items 57 and 58 are the winding knobs therefor for moving a film 60 past the picture frame in the focal plane in a manner well understood by those skilled in the art.

I have furthermore shown a shutter 61 of usual design encircling the lens or objective 62 and being suitably mounted in the front casing or panel 51. The lens aperture or stop adjusting member of the shutter has an extension 63 passing through an arcuate slot 64 in the front panel and terminating in a pointer or index 65 bent at a right angle and arranged to cooperate with the stop scale 66 provided upon the front of panel 51. Extension 63 also carries a flexible sliding contact 67 arranged to cooperate with a wire wound resistance 68 corresponding to resistance 17 of Figure 1. In this manner, adjustment of the stop will result in corresponding variation of the resistance inserted in the photo-electric circuit in the manner understood from the above.

The exposure time adjustment of the shutter 61 is likewise provided with an extension 70 passing through a slot 71 in the panel 51 and terminating in a pointer 72 bent at a right angle and arranged to cooperate with the exposure time scale 73 also applied to the front of panel 51. The exposure time adjustment is furthermore arranged to move a rack 74 by way of an intermediary gear 75, said rack carrying a transparent member of glass, Celluloid or the like 76 having applied thereto an opaque index 77 of diamond or other shape and extending laterally through a suitable slot 78 of the casing 51 as shown and corresponding to the elements 36 and 37, respectively, of Figure 1.

The photo-electric cell 80 and indicator 81 are suitably mounted on the top of the camera body, the cell 80 being arranged in front of the indicator as shown so as to point in substantially the same direction as the camera lens 62 to cover the same field as the latter by the provision of suitable means such as a known cellular baffle 82 or the like mounted in front of the sensitive surface of the cell to secure a limited acceptance angle corresponding to the picture or field angle of the camera.

The meter 81 is enclosed by a casing which may serve to house further auxiliary apparatus such as a view finder 83 and is provided with a window 84 through which are visible the pointer 85 and the ground glass or dial 86 upon which appears an image 77' of the index 77 by the provision of a suitable optical system comprising a cylindrical lens 87 and a reflector 88 suitably mounted in the camera body as shown and well understood from the description of Figure 1. In this manner, the index member 76 is arranged to be illuminated by light rays emanating from the scene or object in the operative position of the camera or meter, thus insuring a brilliant image 77' of index 77 upon the ground glass 86 under all circumstances. The arrangement is otherwise substantially similar and designed to function in the same manner as Figure 1.

The exposure meter for manual determination of the stop and exposure time is suitably mounted adjacent to the indicator and comprises a switch 90 adjustable to two positions suitably identified for automatic or manual operation and scale members 42 and 44, the former having a knurled adjusting knob 91 coupled with the compensating resistance 40 in a manner understood from the drawings.

The space on the other side of the indicator 81 and view finder 83 may be utilized for mounting other auxiliary apparatus, such as a range or distance finder suitably combined with the view finder 83 and coupled with the focusing arrangement of the camera (not shown), said range finder comprising a further light admitting window shown at 93.

The invention, as will be evident from the foregoing, has special advantages for collapsible bellows type cameras as shown in the drawings, in that it avoids complicated transmission elements between the collapsible front 51 and the main body 50. Similar advantages, however, are obtained with cameras of different design and construction. The electrical connections between the several parts and elements may be made through suitable wires or flexible leads arranged inside the bellows 52 or secured to the links 53 and 54 so as to be hidden from sight in the normal or operating position of the camera or in any other suitable manner well understood.

It will be evident from the foregoing that the invention is not limited to the specific details, arrangement of parts and constructions shown and disclosed herein for illustrative purposes, but that the underlying thought and inventive principle are susceptible of numerous variations and modifications coming within the broader scope and spirit of the invention as defined by the appended claims. Thus, it is understood that the compensating resistance 68 in Fig. 3 coupled with the stop or aperture adjustment 63 may be designed to vary in such a manner, by varying the spacing or size of the successive winding turns or in any other suitable manner, as to obtain equal variation of the pointer 85 and cooperating index mark 77', respectively, in terms of exposure units affecting the sensitive plate or film 60 in the camera. The specification and drawings are accordingly to be regarded in an illustrative rather than a limiting sense.

I claim:

1. The combination with a photographic camera comprising a body and a lens and shutter extensibly and collapsibly connected to said body, said shutter having lens aperture and exposure time adjusting means, of a photoelectric device mounted upon said camera and adapted to produce a response current proportional to the brightness of a scene to be photographed, current indicating means mounted upon said body and electrically connected to said photoelectric device, adjustable electrical resistance means in positive coupling connection with one of said adjusting means to control the response current of said device, index means arranged relatively close to and in positive coupling connection with the other of said adjusting means, and further means for producing an optical image of said index means adjacent to said indicating means in the extended position of said shutter to serve as an adjusting mark for said indicating means of variable position in accordance with the setting of said last mentioned adjusting means.

2. The combination with a photographic camera comprising a body and a lens and shutter extensibly and collapsibly connected to said body, said shutter having lens aperture and exposure time adjusting means, of a photoelectric device mounted upon said camera and adapted to produce a response current proportional to the brightness of a scene to be photographed, a current indicator mounted upon said body and electrically connected to said photoelectric device, a dial and cooperating pointer for said indicator, adjustable electrical resistance means for controlling the response current of said photoelectric device and arranged in positive coupling connection with one of said adjusting means, index means arranged relatively close to and in positive coupling connection with the other of said adjusting means, and further means for producing an optical image of said indicating means upon said dial in the extended position of said shutter to serve as a fiduciary mark for said pointer of varying position in accordance with the setting of said last mentioned adjusting means.

3. The combination with a photographic camera comprising a body and a lens and shutter extensibly and collapsibly connected to said body, said shutter having lens aperture and exposure time adjusting means, of a photoelectric device mounted upon said camera and adapted to produce a response current proportional to the brightness of a scene to be photographed, a current indicator mounted upon said body and having a dial and cooperating pointer, adjustable electrical resistance means for controlling the response current of said photoelectric device and arranged in positive coupling connection with one of said adjusting means, said photoelectric device, said indicator and said resistance means being electrically connected in series, index means arranged relatively close to and in positive coupling connection with the other of said adjusting means, means for producing an optical image of said index means upon said dial in the extended position of said shutter to serve as a fiduciary mark for said pointer of varying position in accordance with the setting of said last mentioned adjusting means, and a further variable resistance in series with said first resistance means and adjustable in accordance with an additional exposure controlling factor.

4. The combination with a photographic camera comprising a body and a lens and shutter extensibly and collapsibly connected to said body, said shutter having lens aperture and exposure time adjusting means, of a photoelectric device mounted upon said camera and adapted to produce a response current proportional to the brightness of a scene to be photographed, a current indicator mounted upon said body, a pointer and dial for said indicator, adjustable electrical resistance means for controlling the response current of said device and arranged in positive coupling connection with one of said adjusting means, said photoelectric device, said indicator and said resistance means being electrically connected in series, index means arranged relatively close to and in positive coupling connection with the other of said adjusting means, said index means being arranged to be illuminated by light rays emanating from the scene to be photographed in the operative position of said photoelectric device, and further means for producing an optical image of said index means upon said dial in the extended position of said shutter to serve as a fiduciary mark for said pointer of varying position in accordance with the setting of said last mentioned adjusting means.

5. The combination with a photographic camera comprising a body and a lens and shutter extensibly and collapsibly connected to said body, said shutter having lens aperture and exposure time adjusting means, of a photoelectric device mounted upon said camera and adapted to produce a response current proportional to the brightness of a scene to be photographed, a current indicator mounted upon said body and electrically connected to said device, a ground glass dial and pointer for said indicator, an adjustable electrical resistance for controlling the response current of said photoelectric device and arranged in positive coupling connection with one of said adjusting means, index means arranged relatively close to and in positive coupling connection with the other of said adjusting means, and further means including lens means for producing an optical image of said index means upon said dial in the extended position of said shutter to serve as an adjusting mark for said pointer of varying position in accordance with the setting of said last mentioned adjusting means.

6. The combination with a photographic camera comprising a body and a lens and shutter extensibly and collapsibly connected to said body, said shutter having lens aperture and exposure time adjusting means, of a photoelectric device mounted upon said camera and adapted to produce a response current proportional to the brightness of a scene to be photographed, a current indicator mounted upon said body and electrically connected to said device, a ground glass dial and pointer for said indicator, means in positive coupling connection with one of said adjusting means for controlling the response current of said device, an index member arranged relatively close to and in positive coupling connection with the other of said adjusting means, said index member having relatively opaque and transparent portions to form an index mark, and means including lens means for producing an optical image of said index mark upon said dial in the extended position of said shutter for cooperation with said pointer.

7. The combination with a photographic camera comprising a body and a lens and shutter extensibly and collapsibly connected to said body, said shutter having lens aperture and exposure time adjusting means, of a photoelectric device mounted upon said camera and adapted to produce a response current proportional to the brightness of a scene to be photographed, a current indicator mounted upon said body and electrically connected to said device, a ground glass dial and pointer for said indicator, means in positive coupling connection with one of said adjusting means for controlling the response current of said device, an index member arranged relatively close to and in positive coupling connection with the other of said adjusting means, said index member comprising a transparent portion carrying an opaque index mark and being arranged to be illuminated by light from the scene to be photographed in the measuring position of said photoelectric device, and means including lens means for producing an image of said index mark upon said dial in the extended position of said shutter for cooperation with said pointer.

8. The combination with a photographic camera comprising a body and a lens and shutter extensibly and collapsibly connected to said body, said shutter having lens aperture and exposure time adjusting means, of a photoelectric device mounted upon said camera and adapted to produce a response current proportional to the brightness of a scene to be photographed, a current indicator mounted upon said body and electrically connected to said photoelectric device, a ground glass dial and pointer for said indicator, a variable electrical resistance in positive coupling connection with one of said adjusting means and arranged to control the response current of said photoelectric device, an index member arranged relatively close to and in positive coupling connection with the other of said adjusting means, said index member comprising a transparent portion carrying an opaque index mark and arranged to be illuminated by light emanating from said scene in the operative position of said photoelectric device, and further means comprising lens means for producing an optical image of said index mark upon said dial in the extended position of said shutter for cooperation with said pointer.

9. The combination with a photographic camera comprising a body and a lens and shutter extensibly and collapsibly connected to said body, said shutter having lens aperture and exposure time adjusting means, of photoelectric means mounted upon said camera and adapted to produce a response current proportional to the brightness of a scene to be photographed, a current indicator mounted upon said body and electrically connected to said photoelectric means, means in positive coupling connection with one of said adjusting means to control the response current of said device, index means arranged relatively close to and in positive coupling connection with the other of said adjusting means, and means for producing an optical image of said index means adjacent to said indicator in the extended position of said shutter to serve as a fiduciary mark therefor of varying position in accordance with the setting of said last mentioned adjusting means.

10. The combination with a photographic camera comprising a body and a lens mount extensively and collapsibly connected to said body and provided with adjustable exposure control means, photoelectric means mounted upon said camera and adapted to produce a response current varying according to the brightness of a scene to be photographed, a current indicator mounted upon said body and electrically connected to said photoelectric means, index means arranged relatively close and in positive coupling connection with said exposure control means, and means for producing an optical image of said index means adjacent to said indicator in the extended position of said lens mount to serve as a fiduciary adjusting mark for said indicator of varying position in accordance with the setting of said exposure control means.

KARL RATH.